(12) United States Patent
Yang

(10) Patent No.: US 9,410,571 B2
(45) Date of Patent: Aug. 9, 2016

(54) VACUUM TRIPLE-STRUCTURE SUCTION PLATE

(71) Applicant: JSM CO., LTD., Chungcheongbuk-do (KR)

(72) Inventor: Kyeung Tae Yang, Chungcheongbuk-do (KR)

(73) Assignee: JSM CO., LTD., Chungcheongbuk-do (KR)

( * ) Notice: Subject to any disclaimer, the term of this patent is extended or adjusted under 35 U.S.C. 154(b) by 0 days.

(21) Appl. No.: 14/787,761

(22) PCT Filed: Oct. 1, 2014

(86) PCT No.: PCT/KR2014/009263
§ 371 (c)(1),
(2) Date: Oct. 28, 2015

(87) PCT Pub. No.: WO2015/199284
PCT Pub. Date: Dec. 30, 2015

(65) Prior Publication Data
US 2016/0169268 A1  Jun. 16, 2016

(30) Foreign Application Priority Data
Jun. 26, 2014  (KR) .......................... 10-2014-0078884

(51) Int. Cl.
*A47G 1/17*       (2006.01)
*A47G 29/00*     (2006.01)
*F16B 47/00*     (2006.01)

(52) U.S. Cl.
CPC ..................... *F16B 47/00* (2013.01)

(58) Field of Classification Search
CPC .................................................. F16B 47/00
See application file for complete search history.

(56) References Cited

U.S. PATENT DOCUMENTS

| 2009/0189033 A1* | 7/2009 | Lin | F16B 47/00 248/205.5 |
| 2010/0012800 A1* | 1/2010 | Chen | F16B 47/00 248/205.4 |
| 2010/0252700 A1* | 10/2010 | Wang | F16B 47/00 248/206.2 |

FOREIGN PATENT DOCUMENTS

| CN | 203067512 U | 7/2013 |
| JP | 2011-094715 A | 5/2011 |
| KR | 20-1995-0008474 Y1 | 10/1995 |
| KR | 20-0318414 Y1 | 6/2003 |
| KR | 20-0392839 Y1 | 8/2005 |
| KR | 20-2008-0000699 Y1 | 4/2008 |
| KR | 10-2013-0099399 A | 9/2013 |

* cited by examiner

*Primary Examiner* — Amy Sterling
(74) *Attorney, Agent, or Firm* — Rabin & Berdo, P.C.

(57) ABSTRACT

The present invention relates to a vacuum triple-structure suction plate, and more particularly, to a vacuum triple-structure suction plate that is detachably attached to the walls in a bathroom or a kitchen by vacuum pressure and has a suction plate 110 recessed downward so that when the suction plate 110 is pulled up to be sucked by vacuum, the bottom is brought in close contact with a surface from the middle portion into a vacuum state and is then completely brought in close contact with the surface by stress in the body 300.

2 Claims, 6 Drawing Sheets

VACUUM TRIPLE-STRUCTURE SUCTION PLATE

TECHNICAL FIELD

The present invention relates to a vacuum triple-structure suction plate, and more particularly, to a vacuum triple-structure suction plate that is detachably attached to the walls in a bathroom or a kitchen by vacuum pressure has a suction plate recessed downward so that when the suction plate is pulled up to be sucked by vacuum, the bottom is brought in close contact with a surface from the middle portion into a vacuum state and is then completely brought in close contact with the surface by stress in the body.

BACKGROUND ART

In general, a vacuum suction plate is a tool for attaching light articles such as a towel rack, a soap dish, a cabinet for toilet articles, and a toilet paper holder on surfaces without holes such as glass or a tile.

In general, multiplex housing with less space for keeping stuffs keenly requires various spaces and cabinets for keeping stuffs. Places that are generally used for this purpose are various walls, and nails (bolts), adhesives, and double-sided tapes are mostly used.

As apartments that are one of multiplex housing are increasingly structured, it causes various dangers to drive a nail in a wall, it is difficult to drive a nail in a concrete structure, and driving a nail in a wall damages the structure and does large harm to neighbors with noise, which causes social problems with various noise harms. As an alternative to a nail, adhesives or double-sided tapes are used, but adhesives provide large strength, but leave traces and cannot be reused at other positions and double-sided tapes provide small strength and thus are used for limited purposes.

One of products for coping with this inconvenience is a vacuum suction plate, and various products have been developed from a dish type suction plate to a vacuum suction that can be attached to uneven surfaces.

Further, a 'sticking device' has been disclosed in Korean Utility Model No. 20-0318414 to solve this problem. However, the sticking device has a defect that a vacuum state is removed by air that easily flows inside the device due to external shock, so the sticking device is easily separated. Further, since it is curved, air flows into the space between a wall and the sticking device before a rotary cap is operated to attach the device, so complete vacuum is not made even if the rotary cap is operated, and accordingly, it is difficult to obtain a large suction force.

Further, a 'suction cup' has been disclosed in Korean Utility Model Application Publication No. 20-2008-0000699 to solve this problem. However, this cup also has the problem described above.

CITATION LIST

[Patent Literature 1] Korean Utility Model No. 20-0318414 (Jun. 18, 2003)
[Patent Literature 2] Korean Utility Model Application Publication No. 20-2008-0000699

DISCLOSURE

Technical Problem

The present invention has been made in an effort to solve the problems of the related art, and an object of the present invention is to provide a vacuum triple-structure suction plate that has large suction force and vacuum force by having an suction diaphragm, an suction plate, and an auxiliary vacuum diaphragm to be detachably attached to walls in a bathroom or a kitchen by vacuum pressure, without the problem that a body rotates and comes off, so the suction plate and the body are separated.

Technical Solution

According to one aspect of the present invention so as to accomplish these objects, there is provided to a vacuum triple-structure suction plate including: a suction unit 100 that includes a suction plate 110 being elastically transformable and having a protrusion 111 on the bottom, a suction diaphragm 120 having a fastening hole 121 at the center so that the protrusion 111 of the suction plate 110 is fitted in the fastening hole 121, and a bolt 130 having a thread on the outer side and coupled to the top of the suction plate 110; an auxiliary vacuum diaphragm 200 having a seat to place the suction plate 110 therein and having an auxiliary vacuum hole 210 at the center through which the bolt 130 is inserted; a body 300 having a seat on the bottom in which the auxiliary vacuum diaphragm 200 is seated, and having a body hole 330 at the center through which the bolt 130 is inserted; a washer coupled to the top of the body 300 and having a washer hole 420 at the center through which the bolt 130 is inserted; and a rotary cap 500 disposed on the washer and having a thread groove 510 having a thread on the inner side to be coupled to the bolt 130.

Also, the body 300 has body protrusions 320 with predetermined intervals around the body hole 330, a boss 530 is formed inside the rotary cap 500, a bolt groove 510 is formed in the boss 530, and bottom grooves 520 are formed with predetermined intervals on the outer side of the boss 530, so the body 300 is rotated at predetermined angles and locked by the combination of the body protrusion 320 and the bottom grooves 520. Moreover, the body protrusion 320 of the body 300 is partially cut so that the rotary cap 500 can be smoothly rotated.

Also, body grooves 310 are formed at the top of the body 300 with predetermined intervals and washer protrusions 410 are formed at the bottom of the washer with predetermined intervals, so that the washer protrusions 410 are coupled to the body grooves 310 to be fastened.

Furthermore, the suction plate 110 is recessed downward so that when the suction plate 110 is sucked by vacuum, the bottom is brought in close contact with a surface from the middle portion into a vacuum state and is then completely brought in close contact with the surface by stress in the body 300.

Advantageous Effects

The vacuum triple-structure suction plate having the configuration and operation described above can maintain a complete vacuum state by doubly making vacuum, so it can prevent a product from separating and fix it more firmly. In particular, since the suction plate has the suction diaphragm made of a soft material, maintenance of the suction force of the suction plate and the sticking force of the auxiliary vacuum diaphragm can be improved.

BRIEF DESCRIPTION OF DRAWINGS

The above and other objects, features and advantages of the present invention will be more apparent from the following detailed description taken in conjunction with the accompanying drawings, in which.

REFERENCE SIGNS LIST

Figure 1:
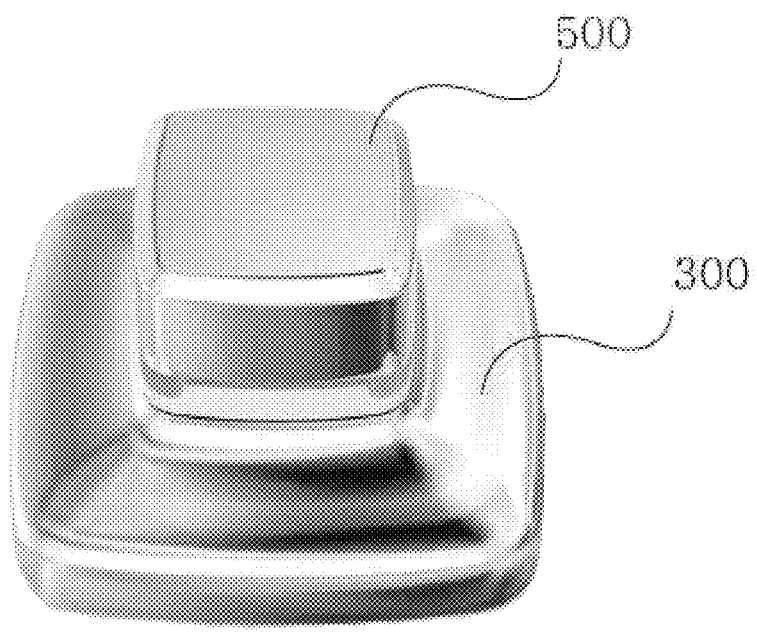
FIG. 1 is a perspective view of a vacuum triple-structure suction plate according to an embodiment of the present invention.

100: Suction unit
110: Suction plate
120: Suction diaphragm
121: Fastening hole
130: Bolt
200: Auxiliary vacuum diaphragm
210: Auxiliary vacuum hole
300: Body
310: Body groove
320: Body protrusions
330: Body hole
400: Washer
410: Washer protrusions
420: Washer hole
500: Rotary cap
510: Bolt hole
520: Bottom groove

DESCRIPTION OF EMBODIMENTS

According to one aspect of the present invention so as to accomplish these objects, there is provided to a vacuum triple-structure suction plate including: a suction unit 100 that includes a suction plate 110 being elastically transformable and having a protrusion 111 on the bottom, a suction diaphragm 120 having a fastening hole 121 at the center so that the protrusion 111 of the suction plate 110 is fitted in the fastening hole 121, and a bolt 130 having a thread on the outer side and coupled to the top of the suction plate 110; an auxiliary vacuum diaphragm 200 having a seat to place the suction plate 110 therein and having an auxiliary vacuum hole 210 at the center through which the bolt 130 is inserted; a body 300 having a seat on the bottom, in which the auxiliary vacuum diaphragm 200 is seated, and having a body hole 330 at the center through which the bolt 130 is inserted; a washer coupled to the top of the body 300 and having a washer hole 420 at the center through which the bolt 130 is inserted; and a rotary cap 500 disposed on the washer and having a thread groove 510 having a thread on the inner side to be coupled to the bolt 130.

Also, the body 300 has body protrusions 320 with predetermined intervals around the body hole 330, a boss 530 is formed inside the rotary cap 500, a bolt groove 510 is formed in the boss 530, and bottom grooves 520 are formed with predetermined intervals on the outer side of the boss 530, so the body 300 is rotated at predetermined angles and locked by the combination of the body protrusion 320 and the bottom grooves 520. Moreover, the body protrusion 320 of the body 300 is partially cut so that the rotary cap 500 can be smoothly rotated.

Also, body grooves 310 are formed at the top of the body 300 with predetermined intervals and washer protrusions 410 are formed at the bottom of the washer with predetermined intervals, so that the washer protrusions 410 are coupled to the body grooves 310 to be fastened.

Furthermore, the suction plate 110 is recessed downward so that when the suction plate 110 is sucked by vacuum, the bottom is brought in close contact with a surface from the middle portion into a vacuum state and is then completely brought in close contact with the surface by stress in the body 300.

Hereinafter, a vacuum triple-structure suction plate according to the present invention will be described in detail with reference to embodiments.

Figure 2:
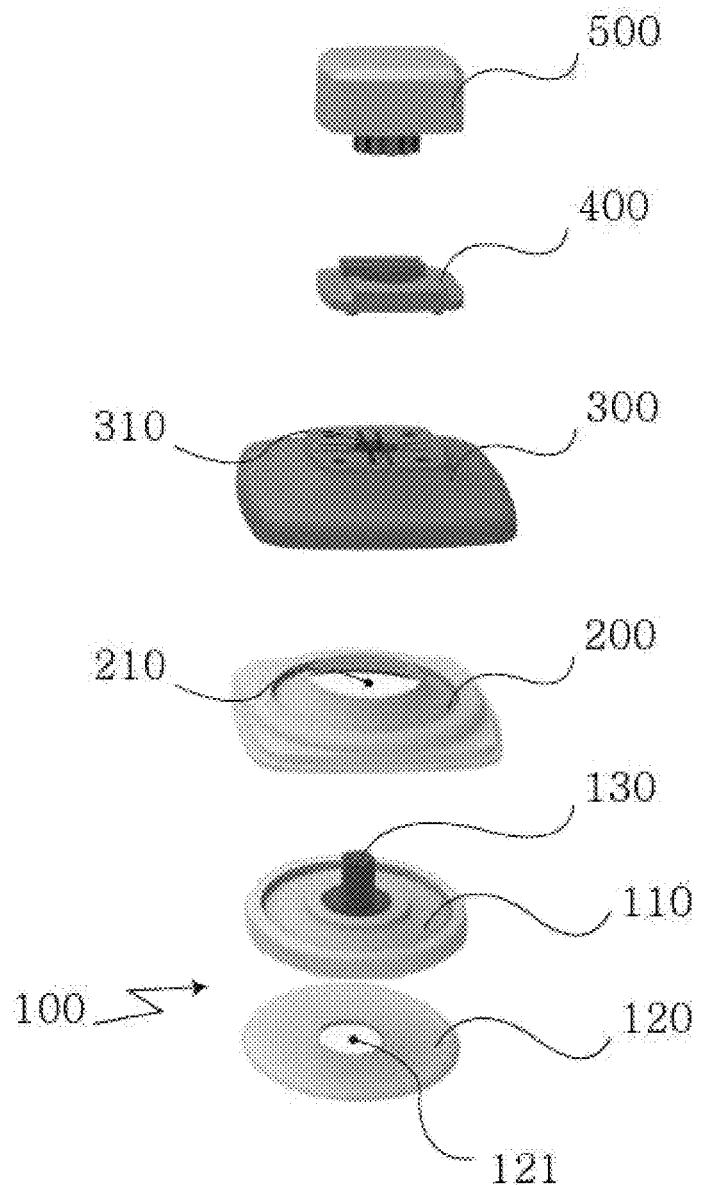
FIG. 2 is an exploded perspective view of the vacuum triple-structure suction plate according to an embodiment of the present invention.

FIG. 1 is a perspective view of a vacuum triple-structure suction plate according to an embodiment of the present invention and FIG. 2 is an exploded perspective view of the vacuum triple-structure suction plate according to an embodiment of the present invention.

The vacuum triple-structure suction plate of the present invention includes a suction unit 100, an auxiliary vacuum diaphragm 200, a body 300, a washer, and a rotary cap 500.

The suction unit 100 is composed of a suction plate 110, an suction diaphragm 120, and a bolt 130.

The suction plate 110 can elastically transform and has a protrusion 111 underneath the center.

The suction diaphragm 120 has a protrusion fastening hole 121 and is coupled to the protrusion 111 of the suction plate 110.

The bolt 130 has a thread on the outer side and is coupled to the top of the suction plate 110 through the auxiliary vacuum diaphragm 200, the body 300, and the washer.

The suction unit 100 is composed of the suction plate 110, the suction diaphragm 120, and the bolt 130, in which the protrusion 111 at the center on the bottom of the suction plate 110 is fitted in the protrusion fastening hole at the center of the suction diaphragm 120 and the bolt 130 is coupled to the top of the suction plate 110, thereby assembling the suction unit 100.

The auxiliary vacuum diaphragm 200 has a seat on the bottom in which the suction plate 110 is seated, and has an auxiliary vacuum hole 210 at the center through which the bolt 130 is inserted.

The body 300 has a seat on the bottom in which the auxiliary vacuum diaphragm 200 is seated, and has a body hole 330 at the center through which the bolt 130 is inserted.

The washer is disposed on the top of the body 300 and has a washer hole 420 for inserting the bolt 130 at the center.

The rotary cap 500 is disposed on the washer, has a boss 530 with a thread on the inner side, and has a bolt hole 510 to receive the bolt 130.

Hereafter, operation of the present invention is described.

A user puts the suction plate 110 on a desired position to attach the vacuum triple-structure suction plate and then rotates the rotary cap 500.

As the rotary cap 500 is rotated, the bolt 130 is inserted into the bolt hole 510 therein and the protrusion 111 of the suction plate 110 of the suction unit 100 coupled to the bolt 130 is moved up. External air cannot flow inside by the suction diaphragm 120, and the inside becomes vacuum as the protrusion 111 of the suction plate 110 is moved up.

Further, as a vacuum state is made by the protrusion 111, the auxiliary vacuum diaphragm 200 and the suction plate 110 are further brought in close contact with each other by stress of the body 300 and the surface area of the suction plate 110 is increased, thereby increasing suction force.

Figure 3:
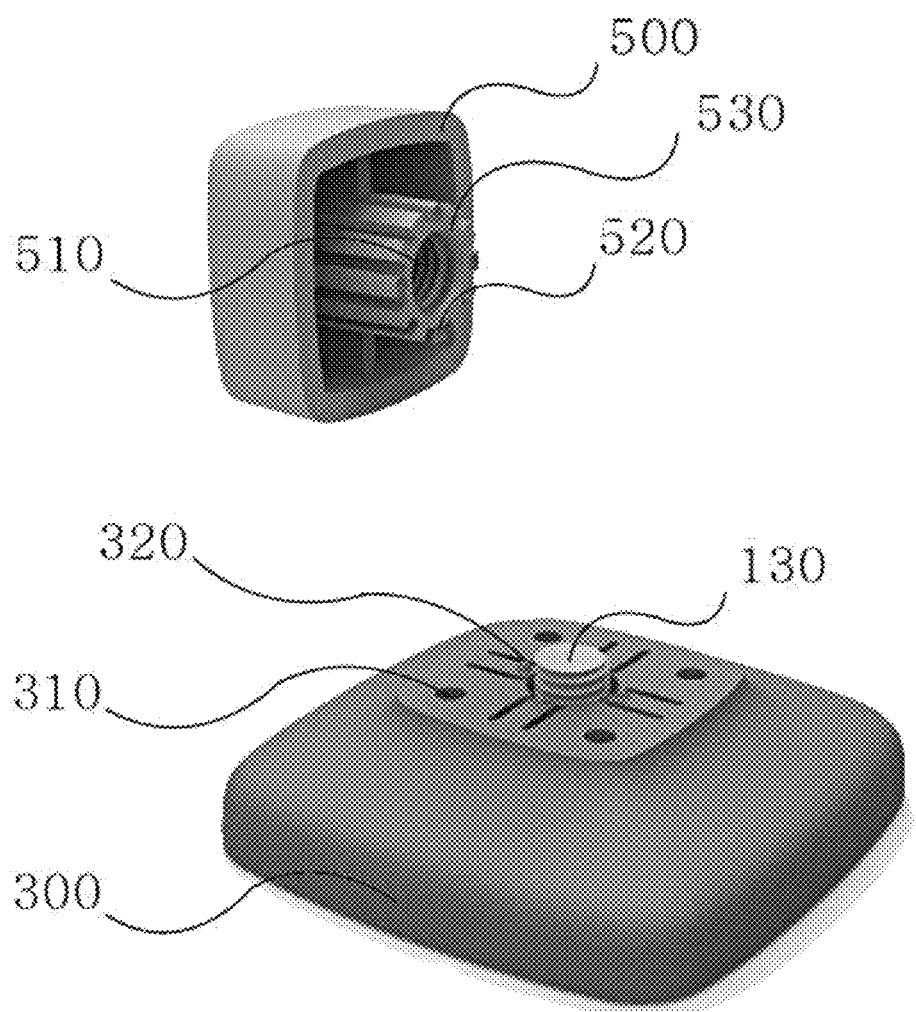
FIG. 3 is an exploded perspective view of a rotary cap of the vacuum triple-structure suction plate according to an embodiment of the present invention.

FIG. 3 is an exploded perspective view of the rotary cap of the vacuum triple-structure suction plate according to an embodiment of the present invention.

The rotary cap 500 has a plurality of bottom grooves 520 around the outer side of the boss 530 to be fitted on body protrusions 320 on the top of the body 300.

The bottom grooves 520 on the inner boss 530 of the rotary cap 500 are fitted on the body protrusions 320 and rotated at a predetermined angle to be locked. The body protrusions 320 of the body 300 are partially cut so that the rotary cap 500 can be smoothly rotated.

Figure 4:
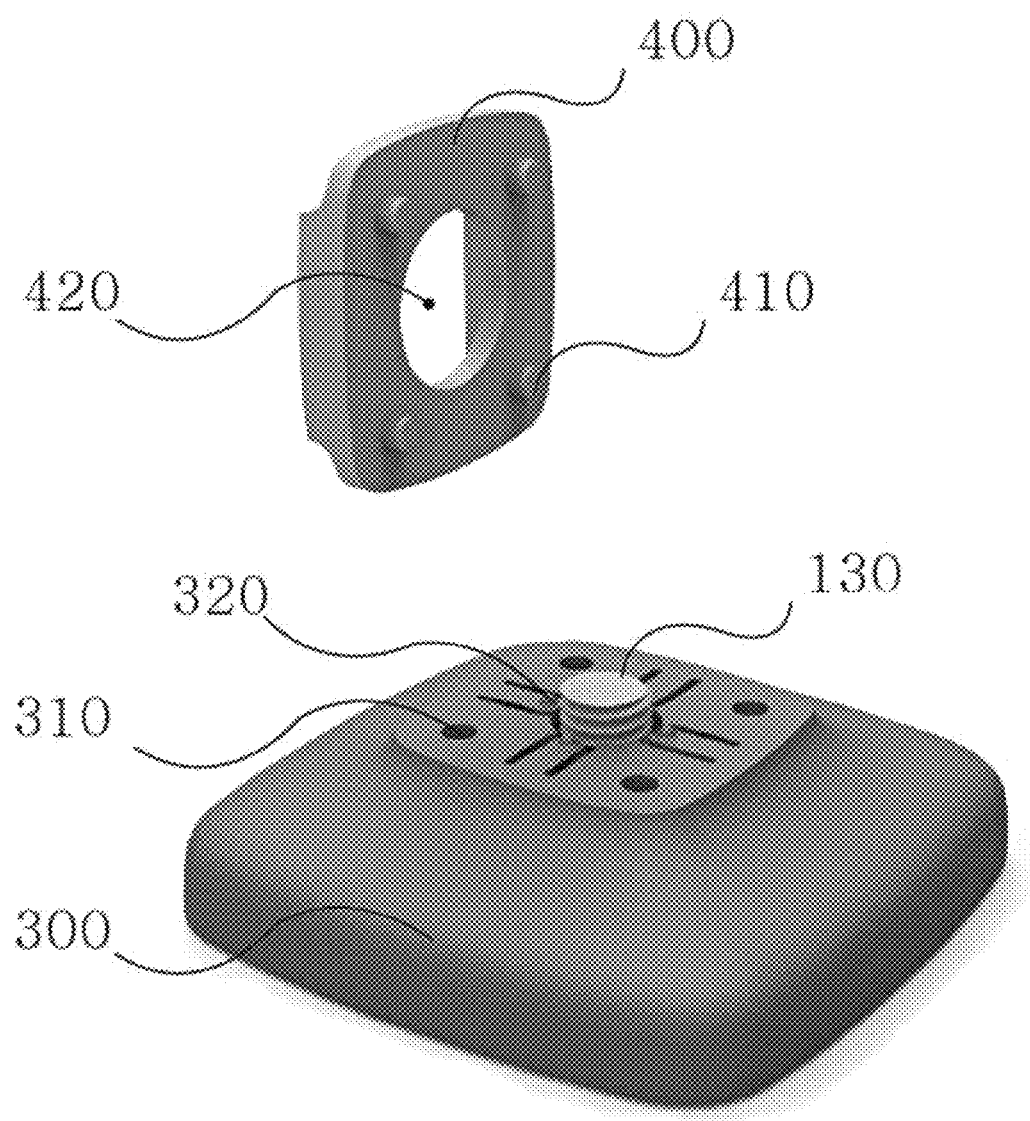
FIG. 4 is an exploded perspective view of a washer of the vacuum triple-structure suction plate according to an embodiment of the present invention.

FIG. 4 is an exploded perspective view of a washer of the vacuum triple-structure suction plate according to an embodiment of the present invention.

The washer has a plurality of washer protrusions 410 on the bottom that are fitted in body grooves 310 formed in the top of the body 300.

The washer is fixed in the body groove 310 of the body 300 and is configured to fasten a shelf so that products such as a shelf can be coupled.

For example, a tower or a toilet paper may be the products.

Figure 5:
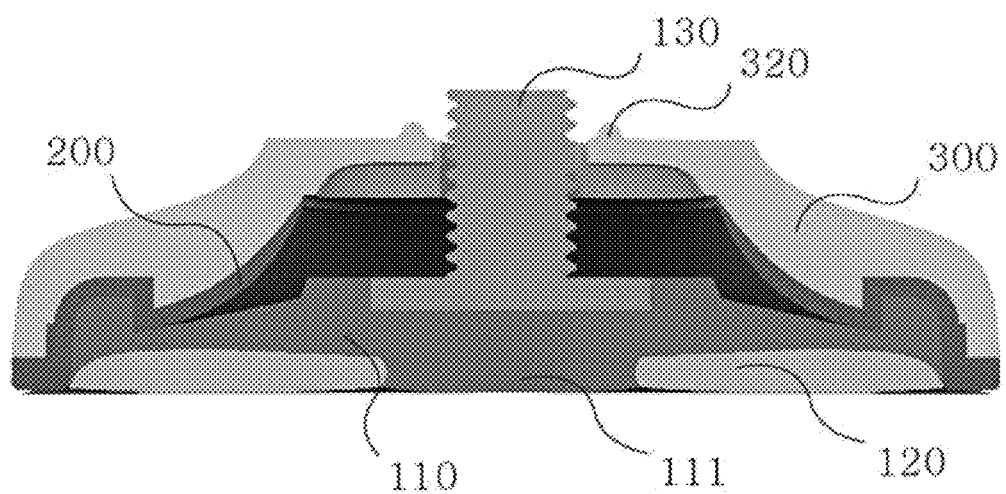
FIG. 5 is a cross-sectional view of the vacuum triple-structure suction plate according to an embodiment of the present invention.
Figure 6:
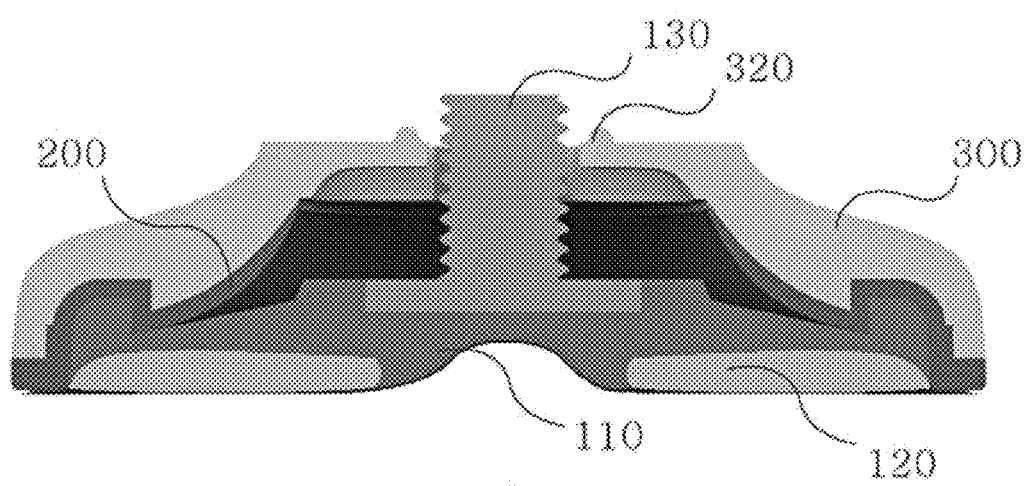
FIG. 6 is a view showing operation of the vacuum triple-structure suction plate according to an embodiment of the present invention.

FIG. 5 is a cross-sectional view of the vacuum triple-structure suction plate according to an embodiment of the present invention and FIG. 6 is a view showing operation of the vacuum triple-structure suction plate according to an embodiment of the present invention.

According to the vacuum triple-structure suction plate, when it is attached, the suction plate 110 is moved up to come in close contact with the auxiliary vacuum diaphragm 200, so the surface area of the suction plate 110 is increased, thereby increasing a suction force. Further, the vacuum triple-structure suction plate can be attached for a longer period of time by the sticking force of the auxiliary vacuum diaphragm 200 in addition to the vacuum suction force of the suction plate 110.

In order to increase the vacuum force made by the suction plate 110, the auxiliary vacuum diaphragm 200 comes in close contact with even small gaps and increases air force, and the suction plate 120 makes vacuum again, so the inside of the suction plate 110 can be maintained in a complete vacuum state.

The vacuum triple-structure suction plate having the configuration and operation described above can maintain a complete vacuum state by doubly making vacuum, so it can prevent a product from separating and fix it more firmly. In particular, since the suction plate 110 has the suction diaphragm 120 made of a soft material, maintenance of the suction force of the suction plate 110 and the sticking force of the auxiliary vacuum diaphragm 200 can be improved.

INDUSTRIAL APPLICABILITY

According to the vacuum triple-structure suction plate that is detachably attached by a vacuum force on the walls in a bathroom or a kitchen, a suction force and a vacuum force are increased by a suction diaphragm, a suction plate, and an auxiliary vacuum diaphragm, and it is possible to solve the problem in the related art that a body is rotated and comes off, so a suction plate and the body are separated, and to increase the suction force and the vacuum force. Therefore, the present invention is useful for installing and fixing various articles on flat walls in various buildings such as a bathroom and a kitchen, and in vehicles.

What is claimed is:

1. A vacuum triple-structure suction plate comprising:
   a suction unit 100 that includes a suction plate 110 being elastically transformable and having a protrusion 111 on the bottom, a suction diaphragm 120 having a fastening hole 121 at the center so that the protrusion 111 of the suction plate 110 is fitted in the fastening hole 121, and a bolt 130 having a thread on the outer side and coupled to the top of the suction plate 110;
   an auxiliary vacuum diaphragm 200 having a seat to place the suction plate 110 therein and having an auxiliary vacuum hole 210 at a center thereof through which the bolt 130 is inserted;
   a body 300 having a seat on a bottom thereof, in which the auxiliary vacuum diaphragm 200 is seated, and having a body hole 330 at a center thereof through which the bolt 130 is inserted;
   a washer coupled to a top of the body 300 and having a washer hole 420 at a center thereof through which the bolt 130 is inserted; and
   a rotary cap 500 disposed on the washer and having a thread groove 510 having a thread on an inner side thereof to be coupled to the bolt 130,
   wherein the body 300 has body protrusions 320 with predetermined intervals around the body hole 330, a boss 530 is formed inside the rotary cap 500, a bolt groove 510 is formed in the boss 530, and bottom grooves 520 are formed with predetermined intervals on the outer side of the boss 530, so that the body 300 is rotated at predetermined angles and locked by the combination of the body protrusion 320 and the bottom grooves 520.

2. The vacuum triple-structure suction plate as claimed in claim 1, wherein the body protrusion 320 of the body 300 is partially cut so that the rotary cap 500 can be smoothly rotated.

* * * * *